US011230874B2

(12) United States Patent
Paul (10) Patent No.: US 11,230,874 B2
(45) Date of Patent: Jan. 25, 2022

(54) FLASHING SYSTEM, APPARATUS AND METHODOLOGY

(71) Applicant: David C. Paul, Frederick, MD (US)

(72) Inventor: David C. Paul, Frederick, MD (US)

(*) Notice: Subject to any disclaimer, the term of this patent is extended or adjusted under 35 U.S.C. 154(b) by 0 days.

(21) Appl. No.: 16/678,403

(22) Filed: Nov. 8, 2019

(65) Prior Publication Data

US 2020/0149342 A1 May 14, 2020

Related U.S. Application Data

(60) Provisional application No. 62/757,351, filed on Nov. 8, 2018.

(51) Int. Cl.
*E06B 1/62* (2006.01)
*E04B 1/66* (2006.01)
*C08L 95/00* (2006.01)

(52) U.S. Cl.
CPC .............. *E06B 1/62* (2013.01); *C08L 95/005* (2013.01); *E04B 1/665* (2013.01); *E06B 2001/628* (2013.01)

(58) Field of Classification Search
CPC ...... E06B 1/62; E06B 2001/628; E04B 1/665; E04B 31/003; C08L 95/005; C08L 95/00; E04D 2013/0468; E04D 13/0459; E04D 13/1415
USPC .......................................... 52/58, 59, 60, 61
See application file for complete search history.

(56) References Cited

U.S. PATENT DOCUMENTS

| 1,980,347 | A | * | 11/1934 | Miller ..................... E04F 13/12 52/290 |
| 4,555,882 | A | * | 12/1985 | Moffitt ...................... E06B 1/70 52/209 |
| 5,630,299 | A | | 5/1997 | Jackman et al. |
| 6,401,401 | B1 | * | 6/2002 | Williams ................. E06B 1/62 49/471 |
| 6,401,402 | B1 | * | 6/2002 | Williams ................. E06B 1/62 49/471 |
| 7,168,209 | B2 | * | 1/2007 | Heidler, Jr. ............. E04D 3/405 52/300 |
| 7,676,996 | B2 | * | 3/2010 | Teodorovich ............. E06B 1/62 52/204.2 |
| 10,273,741 | B1 | * | 4/2019 | Summy ..................... E06B 1/62 |
| 10,731,401 | B2 | * | 8/2020 | Summy ..................... E06B 1/62 |
| 2004/0226252 | A1 | | 11/2004 | Sheldon |

(Continued)

OTHER PUBLICATIONS

Search Report in corresponding PCT/US2019/60498.

(Continued)

*Primary Examiner* — Brent W Herring
(74) *Attorney, Agent, or Firm* — Raymond Van Dyke; Van Dyke Intellectual Property Law (57) ABSTRACT

Systems, components, apparatuses and methodologies of the present invention are directed to techniques that ensure that all deck-to-wall, roof-to-wall and other constructions properly protect the home from the environment, particularly along the wetter coastal regions by forming a layered, waterproof seal of metal, plastic and bitumen. A modularized system of components, that overlap each other either over and or under to create a system that meets the design criteria of critical flashing components, each with waterproofing capability either built-in or applied onsite in use, are employed to cover critical building areas prone to water infiltration and damage.

18 Claims, 7 Drawing Sheets

(56) References Cited

U.S. PATENT DOCUMENTS

| | | | |
|---|---|---|---|
| 2005/0235578 A1* | 10/2005 | Heidler, Jr. ............. | E04D 3/405 52/58 |
| 2005/0268569 A1* | 12/2005 | Teodorovich ............ | E06B 1/62 52/211 |
| 2006/0260213 A1* | 11/2006 | Williams .................. | E06B 1/70 52/60 |
| 2007/0054086 A1 | 3/2007 | Pagel et al. | |
| 2009/0056235 A1 | 3/2009 | Morsching | |
| 2010/0263311 A1 | 10/2010 | Ryden | |
| 2013/0055651 A1 | 3/2013 | Garcia et al. | |
| 2014/0250801 A1 | 9/2014 | Knollmeyer | |
| 2015/0368913 A1 | 12/2015 | Hatch et al. | |

OTHER PUBLICATIONS

Written Opinion in corresponding PCT/US2019/60498.
International Preliminary Report on Patentability and Written Opinion, dated May 11, 2021 for PCT/US2019/060498 (corresponding case to the instant case).

\* cited by examiner

FLASHING SYSTEM, APPARATUS AND METHODOLOGY

CROSS REFERENCE TO RELATED APPLICATION

The present invention is a nonprovisional of and claims priority to U.S. Provisional Patent Application Ser. No. 62/757,351, filed Nov. 8, 2018, entitled "FLASHING SYSTEM AND APPARATUS," the disclosure of which is incorporated herein by reference.

FIELD OF THE INVENTION

The present invention is directed to improvements in the area of construction, such as deck-to-wall, roof-to-wall and other flashing uses.

BACKGROUND OF THE INVENTION

The importance of keeping one's home or business dry is without question. This consideration is magnified when in a wet environment, such as in a coastal area, where water intrusion is frequent due to hurricanes and other weather phenomena. Home owners, as well as home builders, must take extra measures in these situations to protect the home, as well as commercial properties, from the damaging effects of moisture intrusion.

To this day, however, the poor performance of existing flashing and the subsequent water intrusion are a common problem for all homes, and specifically coastal homes. Enhanced flashing techniques are, therefore, recommended in those areas that experience frequent high winds and driving rain.

The deleterious effects of inadequate flashing protection are, of course, bad in other environments too. For example, it should be understood that water penetration along deck ledgers can cause wood dry rot and corrosion of the connectors, ultimately leading to deck collapse. Many other joiner areas present risk as well.

Over the years, various construction codes have been enacted to protect homeowners. However, due to misinterpretations of roof flashing details and accepted testing methods set forth in the American Society of Testing and Materials' (ASTM) D 1970 specification, and the American Architectural Manufacturers Association's (AAMA) 711 Code for flashing roof details, this has unfortunately resulted in catastrophic errors in building code installation details and these deficient methods have propagated through various coastal and other communities. These problems include various means and materials that have, over time, become acceptable "Standards and Practices" of installing deck flashing. However, these means and materials are wholly incorrect, and result in direct and indirect moisture and/or water penetration into the housing envelope, i.e., into the interior portions of a structure.

Indeed, these inaccurately-interpreted rules, methodologies and resulting constructions allow moisture cycling of wood materials, causing structural fatigue and failure, e.g., "Ledger Board Failure," i.e., the sudden and abrupt failure of the ledger board connection to the rim joist of the house, e.g., causing a deck to collapse without warning, when in a live or even dead load condition.

Despite these many years of problems, the industry has yet to fix the various misinterpretations, and even perpetuates these problems through promulgation on the Internet and other forums. What has happened is a form of forced obsolescence, i.e., deck structures that would normally last 20-30 years or more, now fail at 5 or so years because of inadequate protections to the critical joinders between the building and attached structure, compromising the structure unnecessarily.

There are, accordingly, current needs to protect homes and other structures from these problems, and both educate and protect builders that are incorrectly following erroneous guidelines.

There is also a current need for a simple, modularized system for the deployment of the requisite waterproofing materials and components to protect homes and other structures from damage due to moisture.

SUMMARY OF THE PRESENT INVENTION

The systems, apparatuses and methodologies of the present invention are directed to materials, processes and techniques that ensure that all roof-to-wall, deck-to-wall and other constructions properly protect the home from the environment, particularly along the wetter coastal regions. A modularized system of components, that overlap each other either over and or under to create a system that meets the design criteria of critical flashing components, each with waterproofing capability either built-in or applied onsite in use, are employed to cover critical building areas prone to water infiltration and damage.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

The present invention is generally directed to an improved systems, apparatuses, components, processes, methodologies and techniques for usage in construction, particularly regarding the employment and deployment of flashing as a means to control and prevent water penetration into a structure, more particularly regarding improved techniques and modularized components to facilitate the installment of flashing.

With reference now the Drawings, there are illustrated the various manifestations or embodiments of the present invention. As will be noted, the improvements of the present invention over the inadequate and inaccurate prior art involve modularization and the ease of incorporation of moisture-proofing materials in the process. The various modules or components of the assembly or system described herein conjoin in specific ways to implement the purposes of the invention, particularly to protect the home or structure against the effects of unwanted moisture. Representative modules are shown in FIGS. 1-5. Various usages of the module assemblies are shown in FIGS. 6-10.

Figure 1:
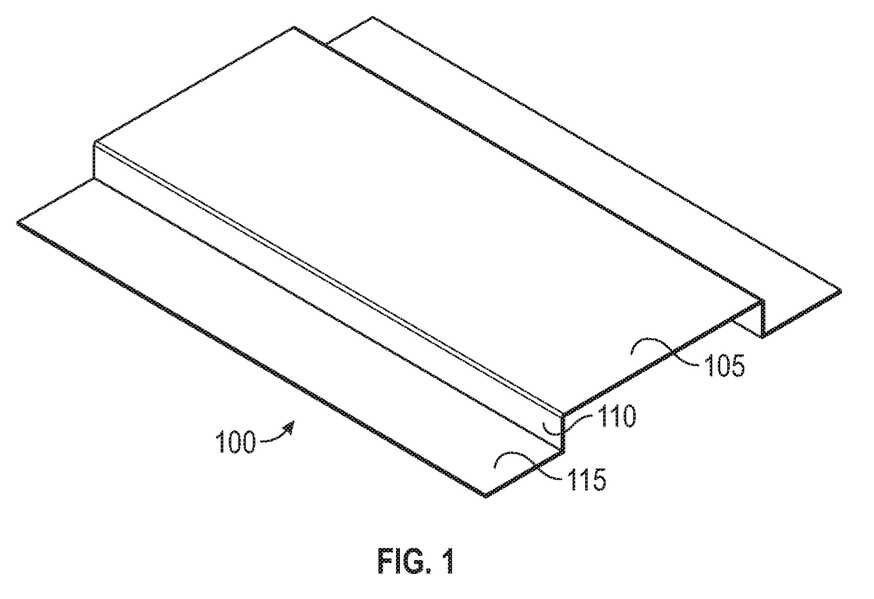
FIG. 1 is a representative isometric view of a component of a flashing system according to a first embodiment configuration of the present invention, particularly a center shield component.

With reference now to FIG. 1 of the Drawings, there is illustrated a first component part of the instant invention, a center shield, generally designated by the reference numeral 100. As shown, the center shield 100 has a ledger portion, generally designated by the reference numeral 105, the underside of which engages a ledger board (reference numeral 620 in later Figures). As is known in the art, a ledger board is affixed to the side of a house or building to provide support for another structure to be affixed thereto, for example, an adjoining deck. The ledger board is thus securely fastened to the side of the house to provide the necessary connection support for the new added structures. Unfortunately, there are cracks or holes often formed in this securement, rendering the areas affected susceptible to water infiltration.

The center shield 100 also has flanges 115 substantially coplanar with the ledger portion 105 but displaced sufficiently, forming a configured space or cavity into which the aforesaid ledger board fits, e.g., the center shield 100 is disposed over a ledger board already secured to a side of a house, where the interior surface of the ledger portion 105 (the obverse surface not shown) engages the ledger board, i.e., the center shield 100 fits over the ledger board, covering it and protecting it from moisture. Alternatively, the center shield 100 can instead be first secured to the exterior wall (or housing sheath) before the installation of the ledger board, and then the ledger board is affixed to the wall, being secured thereto through the center shield 100 component. Although the first embodiment above is generally the preferred one, and described in more detail herein, the alternate embodiment is also contemplated for use in particular instances. Joining the ledger portion 105 to the flanges 115 are side portions 110.

Figure 2:
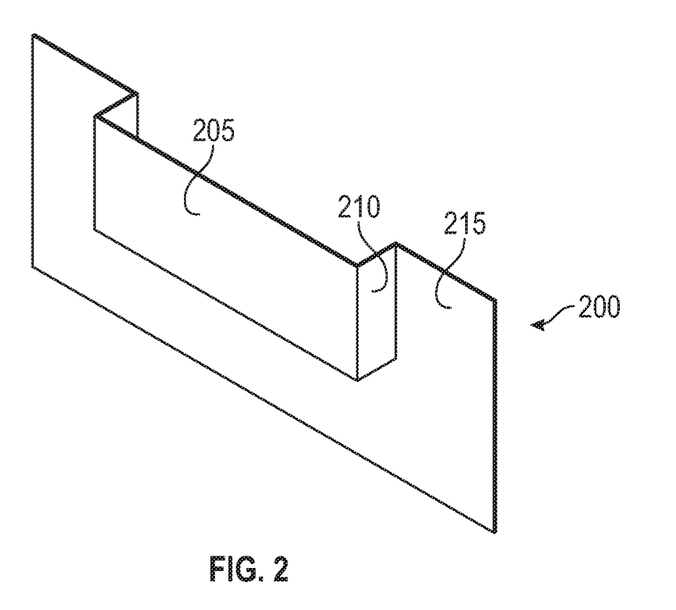
FIG. 2 is a representative isometric view of another component of a flashing system according to a first embodiment configuration of the present invention, particularly an end cap component.

With reference now to FIG. 2 of the Drawings, there is illustrated another component part of the instant modularization invention, an end cap, generally designated by the reference numeral 200. As shown, the end cap 200 has an end ledger portion, generally designated by the reference numeral 205, which is configured to engage a ledger board (reference numeral 620 in later Figures) as described, albeit along the end part of the ledger board. As with the center shield 100, to which the end cap 200 is conjoined in installation, the end cap 200 has a flange 215, and side portions 210 joining the end ledger portion 205 and the flange 215. As noted, a configured space or cavity formed is such that the end cap 200 fits, preferably snugly, over an end part of the ledger board, protecting it from moisture, particularly the end portion which may not be weather treated.

It should be understood that in an alternate configuration the end cap 200 can instead be first secured to the exterior wall (or housing sheath) before the installation of the ledger board, and then the ledger board is affixed to the wall, being secured thereto through the end cap 200.

It should, of course, be understood that the size and dimensions of the center shield 100 and the end cap 200 are such that they form a more unitary structure in appearance, as will be illustrated and described in more detail hereinbelow. In other words, the components of the instant invention should be commensurate in dimension for a given use for both functional and aesthetic reasons.

Figure 3:
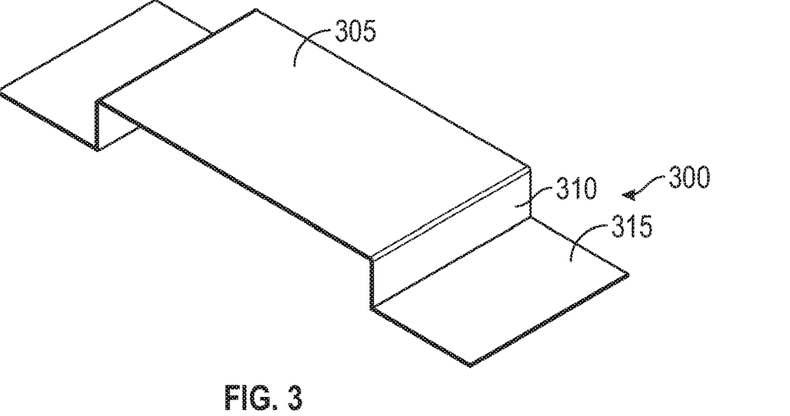
FIG. 3 is a representative isometric view of another component of a flashing system according to a first embodiment configuration of the present invention, particularly a joiner component.

With reference now to FIG. 3 of the Drawings, there is illustrated another component part of the instant invention, a joiner, generally designated by the reference numeral 300. As shown, the joiner 300 has a cover portion, generally designated by the reference numeral 305, which is configured to engage a ledger board (reference numeral 620 in later Figures), as described. As with the center shield 100 and the end cap 200, the joiner 300 has flanges 315 and side portions 310 joining the cover portion 305 and flanges 315. As noted, a configured space or cavity formed is such that the joiner 300 snuggly fits over the ledger board. More particularly, the joiner 300 is primarily employed to cover any gap between two other components, such as two center shields 100, as shown in later figures. As such the size and dimensions of the joiner 300 are such that it covers both the ledger board and the center shields 100 thereon, creating more layers of mechanical and waterproofing protection to the ledger board underneath.

Alternatively, the joiner 300 can instead be first secured to the exterior wall (or housing sheath) before the installation of the ledger board, and then the ledger board is affixed to the wall, being secured thereto through the joiner 300.

Alternatively, the joiner 300 may be employed in the other configuration, i.e., joiner covers two center shields 100 affixed first, covering any gap therebetween. Alternatively, the joiner 300 is first affixed to the wall, then two center shields 100, all forming the cavity into which the ledger board is placed, and then the ledger board is secured, as described. Indeed, the components herein can be employed in over or behind the ledger board configurations, allowing great flexibility during installation.

Figure 4:
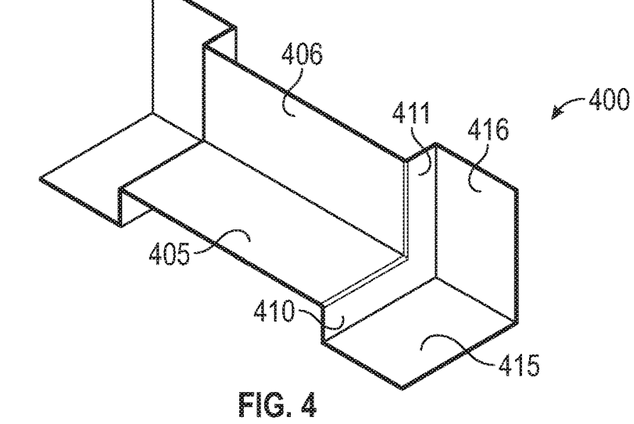
FIG. 4 is a representative isometric view of another component of a flashing system according to a first embodiment configuration of the present invention, particularly an inside corner component.

With reference now to FIG. 4 of the Drawings, there is illustrated another component part of the instant invention, an inside corner, generally designated by the reference numeral 400. In various configurations, the present invention may need to be deployed going around corners. As shown in FIG. 4, first ledger portion 405 and second ledger portion 406 are configured to respectively receive ledger boards or other support members in respective spaces or cavities, as discussed. Two such spaces are shown in this figure. Also shown are a first flange 415 and a second flange 416 respectively connected to the first/second ledger portions 405/406 by first side portion 410 and second side portion 411, respectively.

In deployment, the inside corner 400 fits along an interior junction of two ledger boards (reference numeral 620 in later Figures), the inside corner 400 covers the perpendicular ledger boards and provides mechanical protection thereto. Due to waterproofing materials deployed on surfaces of the inside corner (and adhesively secured to the ledger boards), the inside corner 400 also provides protection against water penetration.

It should, of course, be understood that the inside corner 400 is another modularized component, and can be deployed with the other components described hereinabove and hereinbelow, and interacts with them to form a larger configuration, as shown herein. Alternatively, the inside corner 400 can instead be first secured to the exterior wall (or housing sheath) before the installation of the ledger board, and then the ledger board is affixed to the wall, being secured thereto through the inside corner 400.

Figure 5:
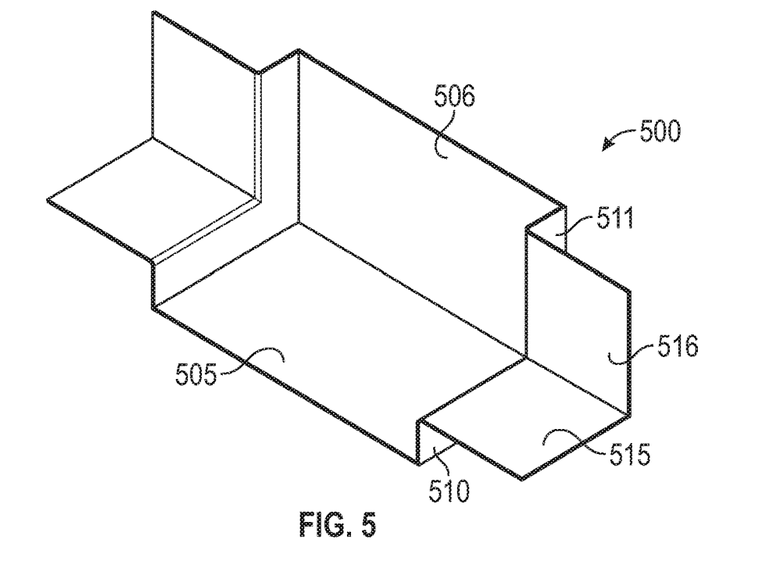
FIG. 5 is a representative isometric view of another component of a flashing system according to a first embodiment configuration of the present invention, particularly an external corner component.

With reference now to FIG. 5 of the Drawings, there is illustrated another component part of the instant invention, an outside corner, generally designated by the reference numeral 500. As with the insider corner 400, the outside corner 500 can be deployed going around external corners. As shown in FIG. 5, first ledger portion 505 and second ledger portion 506 are configured to respectively receive ledger boards or other support members in the space or cavity, as discussed. Also shown are a first flange 515 and a second flange 516 respectively connected to the first/second ledger portions 505/506 by first side portion 510 and second side portion 511, respectively.

In deployment, the outside corner 500 fits along an exterior junction of two ledger boards (reference numeral 620 in later Figures) or other structural members, the outside corner 500 covers the ledger boards and provides mechanical protection thereto. Due to waterproofing materials deployed on surfaces of the outside corner 500 (and adhesively secured to the ledger boards), the outside corner 500, as with the inside corner 400, also provides protection against water penetration. As noted, the outside corner 500 may also be conjoined with other components described herein. Alternatively, as with the inside corner 400, the outside corner 500 can instead be first secured to the exterior wall (or housing sheath) before the installation of the ledger board, and then the ledger board is affixed to the wall, being secured thereto through the outside corner 500.

Figure 6:
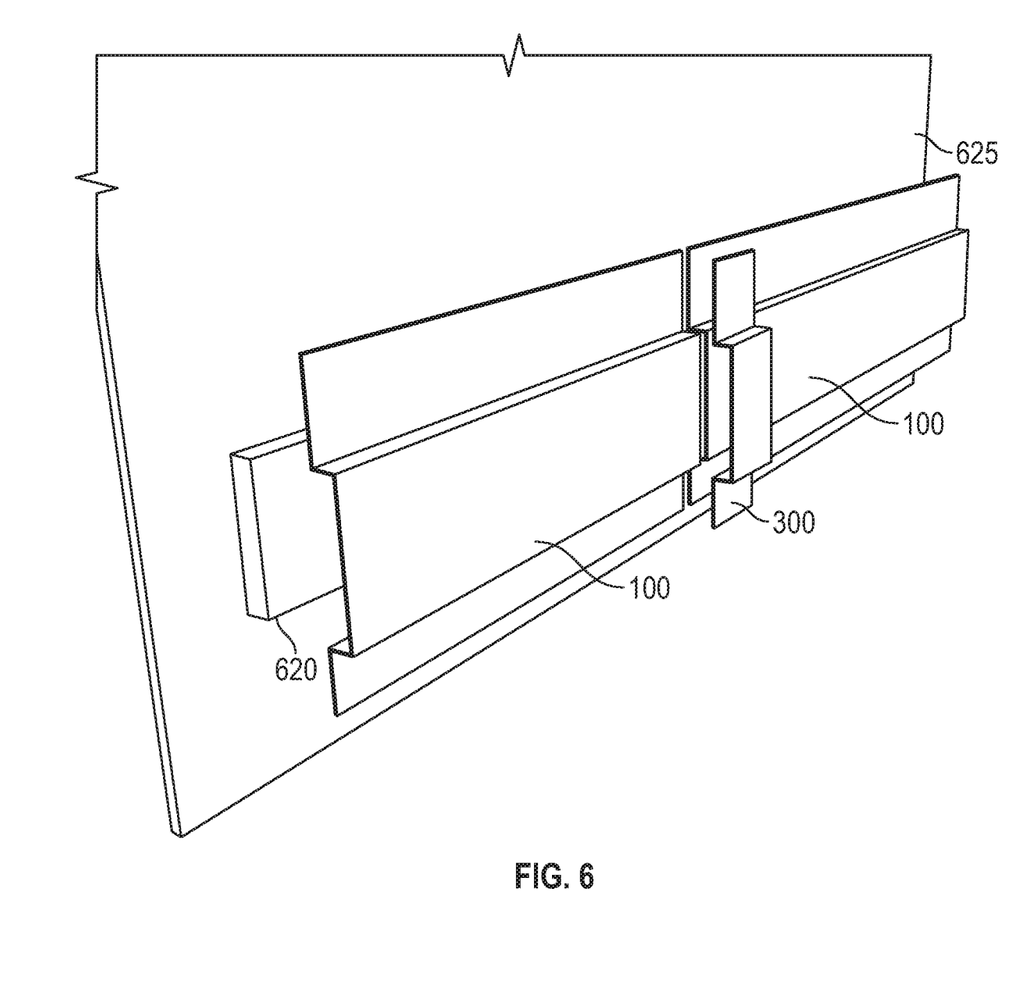
FIG. 6 is an isometric exemplary view of components of the flashing system shown in FIGS. 1-3 in an exemplary configuration being deployed.

With reference now to FIG. 6 of the Drawings, there is illustrated an exemplary usage of the present invention, generally designated by the reference numeral 600, employing components shown in FIG. 1-3. As described, the instant invention can be deployed on an exterior wall of a house or other structure. In the embodiment shown in FIG. 6, a ledger board 620 is secured, e.g., by nails, screws or other means, to a house sheathing, generally designated by the reference numeral 625 over an exterior wall of a structure. The configuration of the present invention is then deployed over the exposed parts of the ledger board 620, mechanically covering the ledger board, and, due to the waterproofing materials, sealing the ledger board 620 from water infiltration.

As shown in FIG. 6, two center shields 100 are shown being secured to the ledger board 620, with a joiner 300 shown going atop the joining of the center shields. It should, of course, be understood that one large center shield 100 may instead be employed without the joinder 300 or a number of smaller center shields 100 with a number of joiners 300 covering the intersections of the respective center shields 100. It is understood, however, that the more unitary something is, the stronger it is. Thus, wherever possible fewer discrete components should be used instead of many, e.g., a longer center shield 100 instead of two center shields 100 with a joiner 300. As mentioned further hereinbelow, dimensions here can extend to 200 feet or more to better have a unitary construction.

As noted, the modularization aspects of the instant invention allows the flexibility of using the appropriate number of components as needed or more as needed. It should, of course, be understood that the added layering formed by the joiner 300 over the center shields 100 provides increased protection at that spot.

Figure 7:
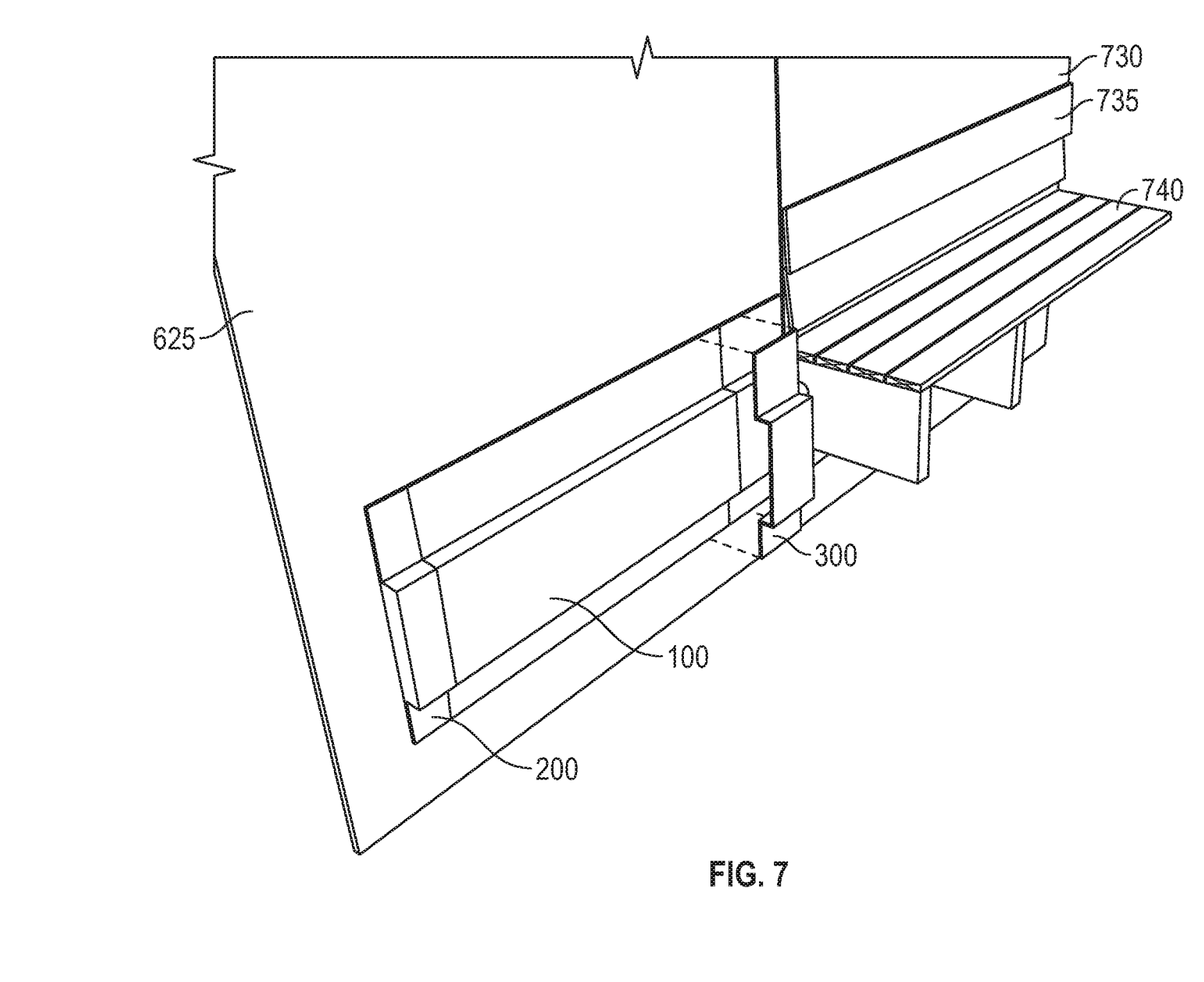
FIG. 7 is an isometric exemplary view of components of the flashing system shown in FIG. 6 in an exemplary configuration further being deployed.

With reference now to FIG. 7 of the Drawings, there is illustrated another exemplary usage of the present invention, generally designated by the reference numeral 700, after further deployments from the configuration shown in FIG. 6. The house sheathing 625 is shown with a building wrap material thereon, generally designated by the reference numeral 730, and with representative siding, generally designated by the reference numeral 735. It should be understood that most, if not all, of the side of a house would be covered by the siding 735, providing mechanical and water-resistance protection against the elements.

In the configuration of FIG. 7, the reason for the ledger board 620 here is shown, i.e., to provide mechanical and structural support for a deck 740. The conjoining of the house and the deck 740 is a problem in that both the house, as well as the deck 740, need to be protected against unwanted moisture accumulation and infiltration, particularly at these junctions that are more horizontal, allowing water pooling and unwanted flows toward the house.

Also shown in FIG. 7 are the two center shields 100 now secured to the ledger board 620, e.g., by an adhesive described in more detail hereinbelow. As also shown is the joiner 300 being placed over the abutting center shields 100 to provide better protection against the elements, covering any gap between the two center shields 100. In addition, to protect the end part of the ledger board 620 an end cap 200 is secured thereto. It should be understood that this conjoining between the end cap 200 and the adjacent center shield 100 may be tight enough to prevent water intrusion, or another joiner 300 may be applied over the two components, as described, providing more layering against water penetration.

Advantages of the instant invention are readily apparent. First the siding 735, which would cover the entire house sheathing 625, would deflect water downward. As shown in FIG. 7, the water would fall or drip down to the deck, near the area covered by the water-repelling components of the present invention. Thus, the deck 740, which could deflect water back to the house, is no longer a problem source for water infiltration since any water now deflected to the house would be prevented from entry by the additional mechanical structures covering the ledger board 620 with the waterproofing properties of the present invention. Now, the presence of cracks or holes in the house sheathing 625 are not the cause of leaks due to the inadequate joinders of decks 740 or other structures to the wall of the house.

For coastal and windy areas, the protections accorded by the instant invention are very useful in preventing water damage, particularly along the most probable sources of infiltration, e.g., the nails, screws, etc. securing the ledger board. With heavy rain, often hitting the house sideways due to heavy winds, water could be introduced almost anywhere along the sides of a house, with the siding handling most of it. Without the water proofing aspects of the instant invention, water could collect or pool around a deck 740 and eventually enter a house. The modularity and water proofing properties of the present invention overcome the problems of the prior art construction protocols and techniques. In these more extreme circumstances, it should be understood that more layering can be applied to better protect against water entry.

It should be understood that the configuration of the present invention may be sized to fit the structure being abutted, i.e., just the deck 740, covering the ledger board 620 only there, or, as depicted, with a larger ledger board 620 extending further for support, the invention extending over all of the ledger board 620 instead of just a part. It should also be understood that siding 735 may extend over the portions of the invention covering the areas of the ledger board 620 not in use, i.e., to the left of the deck 740 in the figures, providing further mechanical protections.

Figure 8:
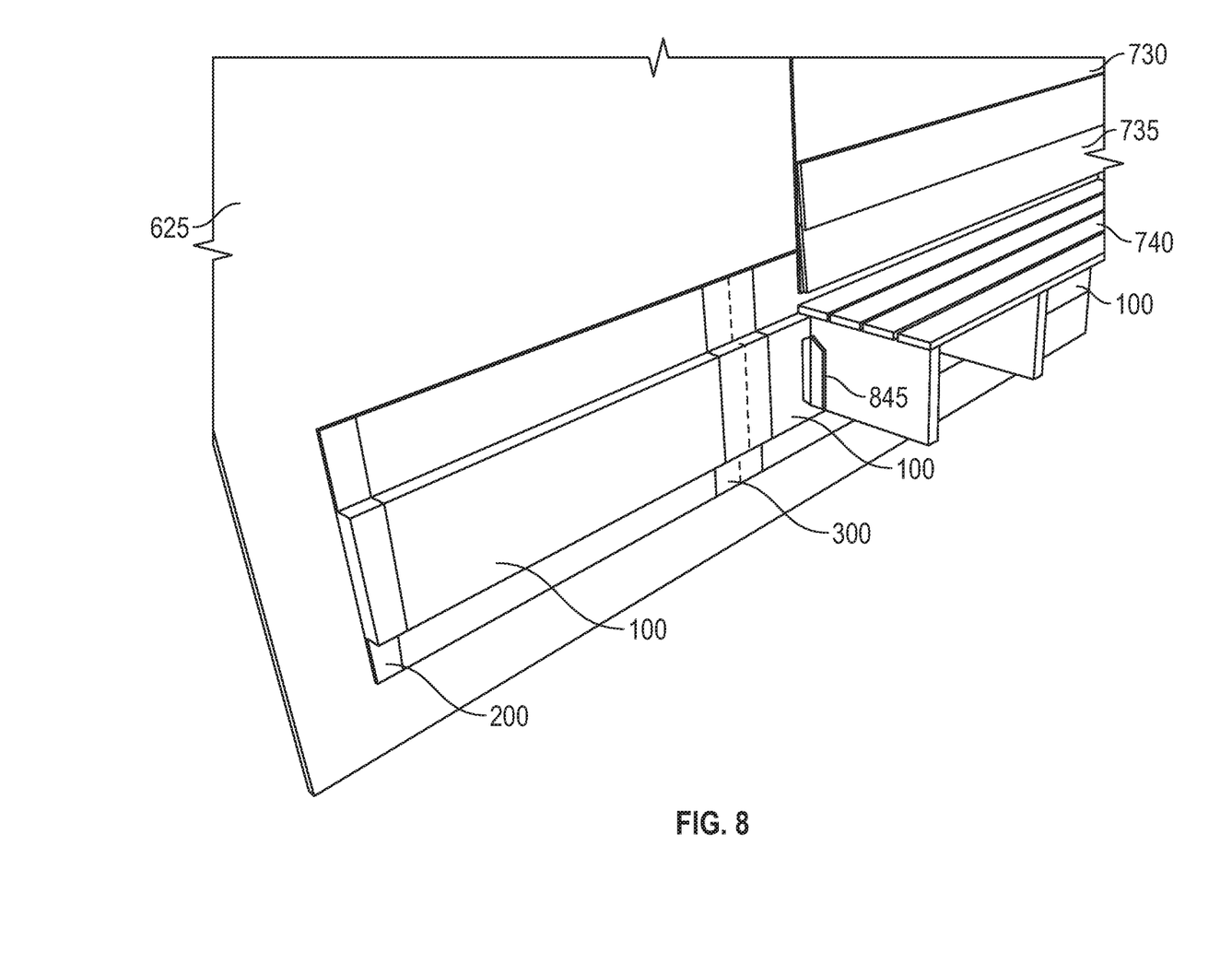
FIG. 8 is an isometric exemplary view of components of the flashing system shown in FIGS. 6 and 7 in an exemplary configuration fully deployed.

With reference now to FIG. 8 of the Drawings, there is illustrated an exemplary usage of the present invention, generally designated by the reference numeral 800, after further deployments from that shown in FIGS. 6 and 7. As shown, the present invention in this embodiment is fully deployed along an exterior wall of a house to support the deck structure 740. The house sheathing 625, covered elsewhere by the aforementioned building wrap 730 and the siding 735, has the ledger board 620 secured thereto, with the various components of the instant invention interconnected and conjoined thereon, providing coverage over the entire ledge board 620 now underneath and protected from the elements. As shown, two center shields 100 have a joiner 300 over top of the conjoining. An end cap 200 is also shown securing the end of the ledger board 620. It should, of course, be understood that a second end cap 200 is preferably deployed at the other end of the ledger board 620.

The deck 740 is shown secured to the rightmost center shield 100, particularly secured to the more secured ledger board 620 underneath. As shown, a lip of the deck 740 may extend out and be supported by the side portion 110 of the center shield 100, actually the top portion of the ledger board 620 underneath. Additional securing means, such as generally designated by the reference numeral 845, provide more stability, affixing the deck 740 to the ledger board 620. Of course, for a deck 740 or other external structure, they are usually supported independently of the house or building. The ledger board 620 is thus primarily used to provide the necessary structural support for the interconnection only.

In the embodiments of the present invention, it should be understood to one of skill in the art that the principles herein apply to an integrated ledger board, and/or porch flashing, and/or roof-to-wall, and/or balcony flashing systems.

Figure 9:
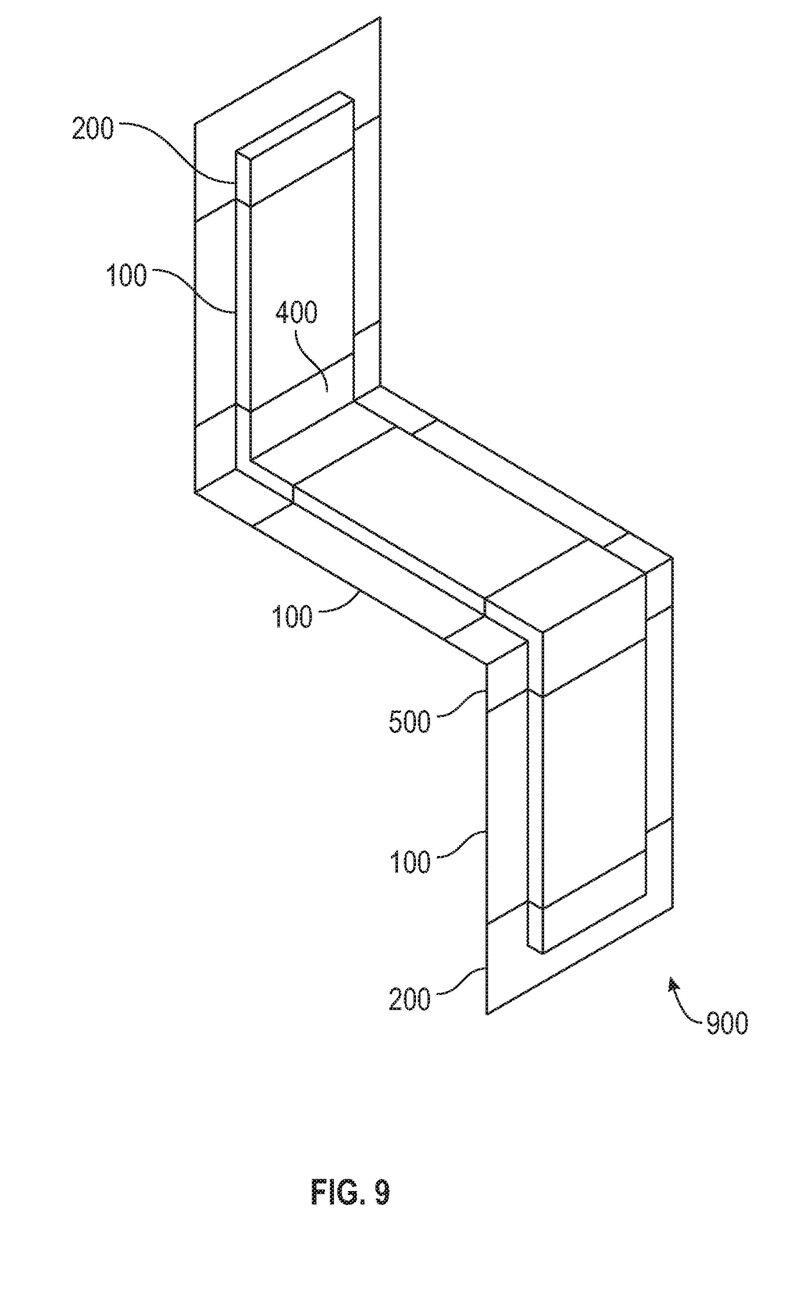
FIG. 9 is an isometric exemplary view of components of the flashing system shown in FIGS. 1-5 in an exemplary configuration.

With reference now to FIG. 9 of the Drawings, there is shown an embodiment of the present invention, generally designated by the reference numeral 900, using almost all of the components described hereinabove in FIGS. 1-5 in another configuration, further illustrating the flexibility of the present invention. For example, deck construction often requires handling curves, such as inside and outside edges in a wraparound deck. Providing support structures across these junctures, which although mostly at right angles, need not be exactly 90 degrees but almost any angles, requires a combination of the aforesaid components. For example, 89 degrees and 91 degrees can be used in various instances. Indeed, the flexibility of the present invention, where the components are made of flexible material, means that any surfaces at any angles can be covered with the improved flashing constructs of the present invention.

As depicted, the interconnected configuration shown has two end caps 200, three center shields, an inside corner 400 and an outside corner 500, the entire configuration wrapping around walls, and providing protections to support members. As illustrated hereinabove, all of these components may cover ledger boards 620 or other structural members, supplying support to an attached deck or other structure, providing mechanical protection and, due to the waterproofing membranes, water protection as well. In deployment, the various components are secured as described above.

The above embodiments are illustrative of various ways to deploy the present invention. There are, of course, numerous other areas that require protection from the elements, and where construction can deploy the instant invention to provide that protection. Scaled configurations of the modular components can be employed to protect other structural members in the same or similar manner as described hereinabove.

For example, the principles of the present invention can be scaled to handle fascia boards or shields, rake shields, freeze shields, trim shields, window shields, door shields, cornice or corner trim, corner posts, column posts, and other situations. Although each of these situations have different circumstances, the principles of the present invention can be readily adapted for each application, as shown hereinbelow.

Figure 10:
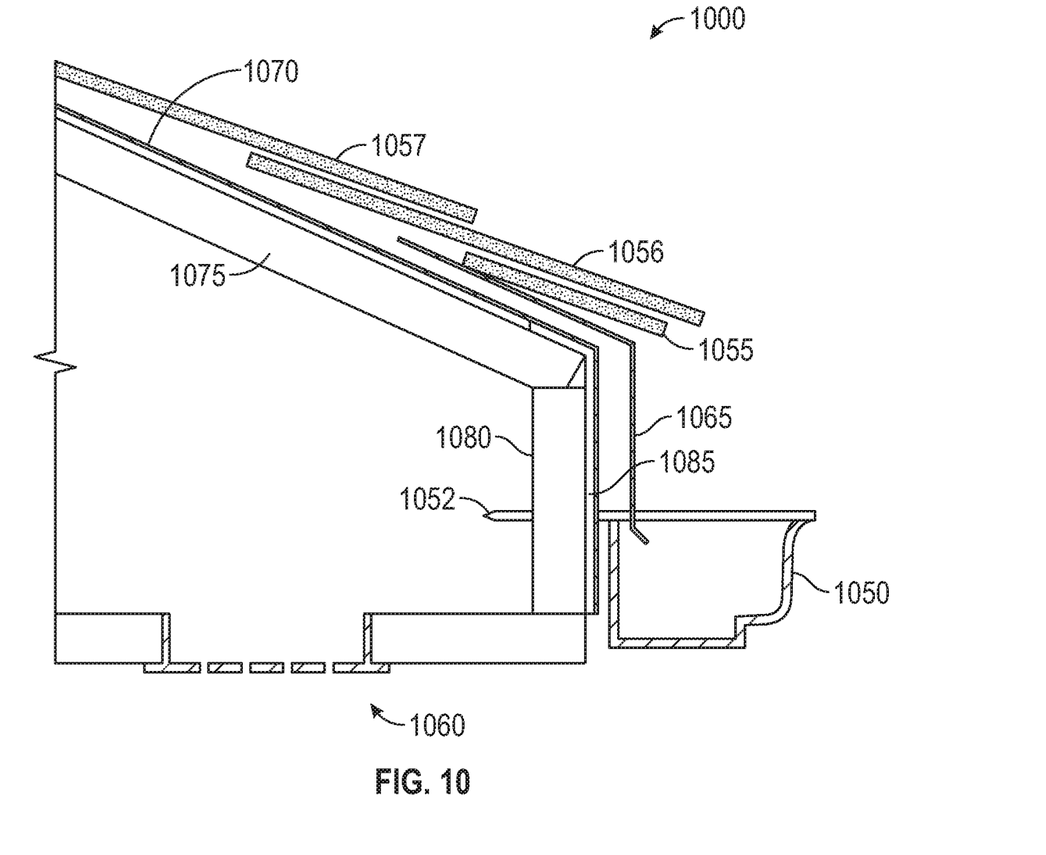
FIG. 10 is a plan view of a roof line of a house, where components of the present invention, such as shown in the previous FIGURES may be deployed.

With reference now to FIG. 10 of the Drawings, there is shown another illustrative embodiment of the present invention, generally designated by the reference numeral 1000, illustrating another use of the invention in another circumstance where errant water needs to be interdicted.

Shown in FIG. 10 is a silhouette of a house, particularly the upper part of the house along the roofline above the exterior walls, along the eave. Attached to the side of the house roof area is a gutter, generally designated by the reference numeral 1050. Also shown is a support for the gutter 1050, generally designated by the reference numeral 1052, which in this embodiment is a bolt or screw extending from the gutter 1050 and piercing the roof wall. As is readily apparent, gutters 1050 extend along an edge of the roof and can be lengthy, requiring many supports 1052 along the way. Each of these piercings provides an avenue for water to enter the roof, e.g., in a driving rain.

The roof itself is protected by a number of shingles, including a start shingle 1055, a first course shingle 1056 atop the start shingle 1055, and a number of other shingles 1057 atop both of these initial shingles. Also shown is a soffit, generally designated by the reference numeral 1060, which most often refers to the material forming a ceiling from the top of an exterior house wall to the outer edge of the roof, i.e., bridging the gap between a home's siding and the roofline, otherwise known as the eaves. Also shown is an eave drip edge, generally designated by the reference numeral 1065, which steers water from the shingles to the gutter 1050. Underneath the aforesaid shingles 1055-1057 is a winterguard layer, generally designated by the reference numeral 1070, which extends across the roof fascia, generally designated by the reference numeral 1075, over the side of the roof and down to the level of the soffit 1060, providing winterizing, as is understood in the art.

As shown in FIG. 10, the fascia 1075 extends across to the edge of the roof, and connects or rests on a roof wall component, generally designated by the reference numeral 1080, through which the aforesaid supports 1052 pierce. The roof wall 1080 provides the needed support for the gutter 1050 along the entire roof edge. Many such roof walls 1080 provide support for all of the gutters 1050 around a house.

Just as a deck may compromise the adjoining house wall, as described hereinabove, the gutters 1050 with the supports 1052 compromise the integrity of the roof interior by virtue of the piercings. Other dangers are present in this embodiment, for example, gutters 1050 overflow and present additional hazards from water penetration. As such, the water-interdicting principles of the present invention apply, and a scaled version of the invention is deployed along the roof wall 1080, thereby providing additional support for the gutter 1050 and better waterproofing the entire roof wall 1080.

With further reference to FIG. 10, the construct of the present invention is shown, in profile, deployed on the roof wall 1080, and generally designated by the reference numeral 1085. As shown and described hereinabove, the construct 1085 resembles the construct shown in FIG. 8, and are deployed in the same way, i.e., interconnecting the components to envelope the structures prone to damage and leaking. As discussed, some or all of the surfaces of the construct 1085 may be covered with the waterproofing material, e.g., both sides may have waterproofing, i.e., the side affixed to the roof wall 1080 and the opposite external side.

As discussed, there are numerous contexts where the principles of the present invention can provide better support and waterproofing. Only a few of these contexts have been named and shown. Nonetheless, it is understood to one of skill in the art how to adapt the principles of the present invention to these other contexts and circumstances. One of skill in the art of construction would readily be able to employ the interconnecting modules in appropriate dimensions for the various usages, and apply the waterproofing as well, whether beforehand or onsite.

It should also be understood that the various components may be incorporated off-site into one contiguous piece, and/or component piece systems individually created, which are then assembled as one contiguous piece onsite, and/or as individual pieces that are assembled in whole or partial components to create an improved flashing system. It should, of course, be understood that these component parts, along with instructions, may be sold as a kit. For example, a kit of components could include a variety of center shields 100, end caps 200, joiners 300, inside corners 400 and outside corners 500 in various amounts. e.g., 5 center shields, 3 end caps, 2 joiners and 1 each of the inside corner and outside corner. Included can be sheets of the waterproofing material, which can be cut to size and applied as needed. As mentioned, a set of instructions can accompany the kit. In view of the general purpose and great variety of applications of the present invention, a variety of such kits can be offered for the great variety of applications and sizes needed, e.g., decks, doors, windows, eaves, etc. where the components are sized for the application and sold accordingly.

As discussed, in addition to the modularity of the components, there is the water proofing aspect of the present invention, described in more detail hereinbelow. FIGS. 1-10 are representative of a preferred usage of layered waterproof membranes and materials in a two-sided embodiment, forming a plurality of layers as the interconnected components overlap each other, e.g., perhaps by 4 or more inches, each component having a waterproofing layer applied the surfaces of the component, these overlapping waterproofing surfaces forming layers. For example, all of the surfaces that will be in contact with the ledger board 620 and the house sheathing, include waterproofing membranes. For example, in FIG. 1, the underside surfaces (not shown) could all be covered by the aforesaid waterproofing membranes, such as in the embodiments shown in FIGS. 1-8. It should, of course, be understood that all of the surfaces could be so covered with waterproofing membranes.

The center shield 100, end cap 200, joiner 300, inside corner 400 and outside corner 500 components can be made of a variety of materials. Possible materials include Polyvinyl chloride (PVC), Acrylonitrile butadiene styrene (ABS) and other thermoplastic polymers, polypropylene resins, and metals, particularly stainless steel and copper.

The sizes and dimensions of the components are variable, e.g., from about ½ or 1 inch to about 200 feet or more, e.g., with ranges from about 1 inch to about 200 feet, about 6 inches to about 100 feet, about 1 foot to about 100 feet, about 1 foot to about 50 feet, about 1 foot to about 25 feet, about 1 foot to about 10 feet, about 6 inches to about 5 feet, about 4 inches to about 4 feet, about 3 inches to about 3 feet, about 2 inches to about 2 feet, about 1 inch to about 1 foot, about ½ inch to about 1 foot, about ½ inch to about 6 inches, about ½ inch to about 4 inches, about ½ inch to about 3 inches, about ½ inch to about 2 inches, and about ½ inch to about 1 inch.

The above dimensions are in height, length or depth, with any combination thereof. For example, for depth or thickness, multiple bends can create configurations of great depth. In any event, the dimensions in either length, width and or depth vary as various profiles and dimensions are used. For the end cap, for example, sizes and dimensions preferably vary from about ½ or about 1 inch to about 40 feet.

In the above embodiments, a given waterproofing membrane preferably has a thickness from about 0.3 to about 0.83 inches, and, as discussed hereinabove and hereinbelow, may have several distinct layers applied, e.g., a layer applied atop another layer, such as when the first one dries, then the other layer is applied, and so on. As discussed, the layering principle is amplified due to the components overlapping.

The aforementioned waterproofing material is preferably a bitumen coating, e.g., an oil based product that has elastic and adhesive qualities that enable it to adhere to multiple surfaces, and, when punctured, forms a sealing bond around the penetration area, thereby preventing moisture intrusion through the membrane.

A preferred waterproofing material is preferably applied in liquid form, and/or in a pre-formed condition with a removeable backer tape to temporarily protect the adhesive side of the product during shipping, and/or in installation, and/or in the manufacturing process. In the field, for example, removable backer tape is removed and the waterproofing membrane is then attached directly to the contacting surfaces required, e.g., during manufacturing process and/or an onsite installation coating the components as they are used. The waterproofing material may also be factory installed. Alternatively, the coating may be installed via a peel and stick, e.g., on site a number of peel and stick panels may be used to cover the components, with an adhesive such as a self-sealing membrane deployed in the field. Instead of individual pieces being premade, the waterproofing material can be cut from a large roll or sprayed onto the surfaces. As noted, more than 1 layer may be applied, and 2-4 layers may be used in process to ensure sealability, e.g., 3 coatings are applied.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed is:

1. A flashing system comprising:
    at least one center shield comprising a ledger portion and flanges, said flanges disposed on a left side and a right side of said ledger portion,
    wherein said ledger portion and said flanges are substantially coplanar but displaced, forming a configured space to receive and cover a ledger board secured to a side wall of a structure along a horizontal axis; and
    at least one end cap comprising an end ledger portion and end flanges, said end flanges disposed on a left side and a right side of said end ledger portion
    wherein said end ledger portion and said end flanges are substantially coplanar but displaced, forming an end configured space to receive and cover an end portion of said ledger board, and
    wherein said at least one end cap is configured perpendicularly to an end portion of said at least one center shield along said horizontal axis,
    wherein said at least one center shield and said at least one end cap have a plurality of surfaces covered by at least one layer of a waterproofing material, and
    whereby said waterproofing material forms a watertight seal preventing water from entering into said structure.

2. The flashing system according to claim 1, further comprising:
    at least one joiner, said at least one joiner configured to cover a seam between components of said flashing system.

3. The flashing system according to claim 1, further comprising:
    at least one inside corner, each of said at least one inside corner configured to receive and cover end portions of respective ledger boards.

4. The flashing system according to claim 1, further comprising:
    at least one outside corner, each of said at least one outside corner configured to receive and cover end portions of respective ledger boards.

5. The flashing system according to claim 1, wherein said at least one center shield and said at least one end cap are conjoined during installation of said flashing system.

6. The flashing system according to claim 1, wherein said at least one center shield and said at least one end cap are conjoined during manufacture and installed as a unitary component during installation.

7. The flashing system according to claim 1, wherein said at least one center shield and said at least one end cap are made out of material selected from the group consisting of polyvinyl chloride (PVC), Acrylonitrile butadiene styrene (ABS), a thermoplastic polymer, polypropylene resins, stainless steel, copper and combinations thereof.

8. The flashing system according to claim 1, wherein said waterproofing material covers all surfaces of said at least one center shield.

9. The flashing system according to claim 1, wherein said waterproofing material covers all surfaces of said at least one end cap.

10. The flashing system according to claim 1, wherein said waterproofing material is a liquid, wherein at least one layer of said liquid is placed on at least one surface of said at least one center shield.

11. The flashing system according to claim 10, wherein said liquid is a bitumen.

12. The flashing system according to claim 10, wherein a plurality of layers of said liquid are placed on at least one surface of said at least one center shield.

13. The flashing system according to claim 1, wherein said at least one layer of said waterproofing material has a thickness between about 0.3 inches and about 0.83 inches.

14. The flashing system according to claim 1, wherein said waterproofing material is a peel, wherein said peel has an adhesive side, said adhesive side placed on at least one surface of said at least one center shield.

15. The flashing system according to claim 14, wherein a plurality of peels are placed on at least one surface of said at least one center shield.

16. The flashing system according to claim 1, wherein said at least one center shield has length and width dimensions selected from the group consisting of about 1 inch to about 200 feet, about 6 inches to about 100 feet, about 1 foot to about 100 feet, about 1 foot to about 50 feet, about 1 foot to about 25 feet, about 1 foot to about 10 feet, about 6 inches to about 5 feet, about 4 inches to about 4 feet, about 3 inches to about 3 feet, about 2 inches to about 2 feet, about 1 inch to about 1 foot, about ½ inch to about 1 foot, about ½ inch to about 6 inches, about ½ inch to about 4 inches, about ½ inch to about 3 inches, about ½ inch to about 2 inches, and about ½ inch to about 1 inch, and combinations thereof.

17. The flashing system according to claim 1, wherein said at least one end cap has length and width dimensions selected from the group consisting of about 1 inch to about 40 feet, about 6 inches to about 40 feet, about 1 foot to about 30 feet, about 1 foot to about 20 feet, about 1 foot to about 10 feet, about 6 inches to about 5 feet, about 4 inches to about 4 feet, about 3 inches to about 3 feet, about 2 inches to about 2 feet, about 1 inch to about 1 foot, about ½ inch to about 1 foot, about ½ inch to about 6 inches, about ½ inch to about 4 inches, about ½ inch to about 3 inches, about ½ inch to about 2 inches, and about ½ inch to about 1 inch, and combinations thereof.

18. The flashing system according to claim 1, wherein said ledger board is affixed to a wall selected from the group consisting of deck boards, fascia boards or shields, rake shields, freeze shields, trim shields, window shields, door shields, cornice or corner trim, corner posts, column posts, and combinations thereof.

* * * * *